(12) United States Patent
Meier et al.

(10) Patent No.: US 9,915,117 B2
(45) Date of Patent: *Mar. 13, 2018

(54) FLUID PULSE VALVE (71) Applicant: Extreme Technologies, LLC, Vernal, UT (US)

(72) Inventors: Gilbert Troy Meier, Vernal, UT (US); Joseph Aschenbrenner, Blackfoot, ID (US); Joshua J. Smith, Vernal, UT (US); James D. Osterloh, West Richland, WA (US); Cameron Dick, Vernal, UT (US)

(73) Assignee: Extreme Technologies, LLC, Vernal, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/467,389

(22) Filed: Mar. 23, 2017

(65) Prior Publication Data

US 2017/0191326 A1   Jul. 6, 2017

Related U.S. Application Data (63) Continuation of application No. 14/339,958, filed on Jul. 24, 2014, now Pat. No. 9,605,511.

(51) Int. Cl.
| | |
|---|---|
| E21B 28/00 | (2006.01) |
| E21B 31/00 | (2006.01) |
| E21B 34/10 | (2006.01) |
| F16K 31/16 | (2006.01) |
| F16K 31/53 | (2006.01) |

(52) U.S. Cl.
CPC ............ *E21B 28/00* (2013.01); *E21B 31/005* (2013.01); *E21B 34/10* (2013.01); *F16K 31/16* (2013.01); *F16K 31/535* (2013.01)

(58) Field of Classification Search
CPC ... E21B 7/24; E21B 4/02; E21B 28/00; E21B 21/10; E21B 34/10; F16K 31/535; Y10T 137/87732
See application file for complete search history.

(56) References Cited

U.S. PATENT DOCUMENTS

| | | |
|---|---|---|
| 3,894,590 A | 7/1975 | Takano et al. |
| 4,662,459 A | 5/1987 | Bodine |
| 6,279,670 B1 | 8/2001 | Eddison et al. |
| 6,439,318 B1 | 8/2002 | Eddison et al. |
| 6,508,317 B2 | 1/2003 | Eddison et al. |
| 8,167,051 B2 | 5/2012 | Eddison et al. |
| 8,281,867 B2 | 10/2012 | Belik |

(Continued)

OTHER PUBLICATIONS

PCT Search Report and Written Opinion for PCT/US15/41913 dated Oct. 23, 2015.
Agitator Tool Handbook, 2013.

*Primary Examiner* — Daniel P Stephenson
(74) *Attorney, Agent, or Firm* — Remenick PLLC (57) ABSTRACT

A fluid pulse valve and a method of using the fluid pulse valve are disclosed. The fluid pulse valve comprises an outer housing, a rotor contained within the outer housing, a stator tube surrounding the rotor and adjacent to the outer housing, the stator tube comprising a plurality of slots, and a closer coaxially and rotationally coupled to the rotor and at least a portion of the closer in line with the plurality of slots. As the closer rotates, the closer covers and uncovers the plurality of slots to create a pulse.

24 Claims, 6 Drawing Sheets

(56) References Cited

U.S. PATENT DOCUMENTS

| | | |
|---|---|---|
| 8,464,525 B2 | 6/2013 | Springett et al. |
| 9,175,535 B2 | 11/2015 | Gregory et al. |
| 9,605,511 B2 * | 3/2017 | Meier .................... E21B 34/10 |
| 2004/0020636 A1 | 2/2004 | Kenison et al. |
| 2005/0087368 A1 | 4/2005 | Boyle et al. |
| 2005/0236190 A1 | 10/2005 | Walter |
| 2007/0188344 A1 | 8/2007 | Hache et al. |
| 2010/0012383 A1 | 1/2010 | Drenth |
| 2010/0065124 A1 | 3/2010 | Samaroo |
| 2011/0073374 A1 | 3/2011 | Bunney et al. |
| 2011/0100719 A1 | 5/2011 | Mildren et al. |
| 2012/0103594 A1 | 5/2012 | Hall et al. |

\* cited by examiner

FLUID PULSE VALVE

REFERENCE TO RELATED APPLICATIONS

This application claims priority to U.S. Non-Provisional application Ser. No. 14/339,958, filed Jul. 24, 2014, entitled "Fluid Pulse Valve," which is hereby specifically and entirely incorporated by reference.

BACKGROUND

1. Field of the Invention

The invention is directed to valves, specifically, the invention is directed to fluid pulse valves.

2. Background of the Invention

Rotary valves are used in industry for a number of applications like controlling the flow of liquids to molds, regulating the flow of hydraulic fluids to control various machine functions, industrial process control, and controlling fluids which are directed against work pieces. The vast majority of these applications are conducted at low fluid pressures and at either low rotational speeds or through an indexed movement. These applications have been addressed through application of various known fluid regulation valve applications including gate valves, ball valves, butterfly valves, rotating shafts with various void designs and configurations, solenoid actuated valves of various designs, and valves designed with disks with multiple holes to redirect flow streams. These applications are generally acceptable for low speed, low pressure processes, but are not suitable for high speed, high pressure processes.

For example, solenoid valves are effective for regulating fluid flow up to a frequency of approximately 300 Hz at a pressure of up to 200 psi. These limitations are primarily due to the physical design of the solenoid which relies upon the reciprocating motion of magnetic contacts and is therefore subject to significant acceleration and deceleration forces, particularly at higher frequencies. These forces, the resulting jarring action, and the frictional heat generated make these type valves subject to failure at high frequencies of actuation.

Rotary valves employing multiple outlets have been used at frequencies up to 1000 Hz in applications where a low pressure differential between valve inlet and outlet ports is desired. These valves, however, are large and complex and necessarily have significant physical space requirements for the valve and for the appurtenant inlet and outlet piping.

Other types of valves have disadvantages that include: the valve actuation cycle speed (frequency) of the valve is too low, the valve is large and physically complex, the valve creates significant head loss, the valve cannot satisfactorily operate at high inlet pressures, or the valve cannot create the necessary frequency or amplitude of flow perturbation.

In the oil and gas industry, bores are drilled to access sub-surface hydrocarbon-bearing formations. Conventional drilling involves imparting rotation to a drill string at surface, which rotation is transferred to a drill bit mounted on a bottom hole assembly (BHA) at the distal end of the string. However, in directional drilling a downhole drilling motor may be used to impart rotation to the drill bit. In such situations it tends to be more difficult to advance the non-rotating drill string through the drilled bore than is the case when the entire length of drill string is rotating. Furthermore, during use, the drill string often becomes jammed or otherwise unable to continue drilling. Currently the entire drill string must be removed to determine the cause of and fix the problem.

For the foregoing reasons, there is a need for a high-speed, high pressure rotary valve for controlling the flow of a fluid to produce high frequency fluid pulses or perturbations. Further, there is a need for such a valve which is suitable for high pressure applications with minimal head loss through the valve and is easily removable to leave a clear bore without disrupting the entire drill string.

SUMMARY OF THE INVENTION

The present invention overcomes the problems and disadvantages associated with current strategies and designs and provides new tools and methods creating rotary valves.

One embodiment of the invention is directed to a fluid pulse valve. The valve comprises an outer housing, a rotor contained within the outer housing, a stator tube surrounding the rotor and adjacent to the outer housing, the stator tube comprising a plurality of slots, and a closer rotationally coupled to the rotor and at least a portion of the closer in line with the plurality of slots. As the closer rotates, the closer covers and uncovers the plurality of slots to create a pulse.

In a preferred embodiment, as fluid passes through the fluid pulse valve, the fluid enters the outer housing, passes through the plurality of oblong slots, into the stator and rotates the rotor. Preferably, the fluid pulse valve further comprises at least one fixed flow area port in the stator tube. Preferably, the fluid pulse valve further comprises a gearbox, wherein gear reduction within the gearbox causes the closer to rotate at a different rate than the rotor. Preferably, at least one of gear ratio of the gearbox or pitch of the rotor is adjusted to alter pulse rate relative to flow rate. The fluid pulse valve is preferably a component of a well bore string.

Preferably, the fluid pulse valve further comprises an anchor coupled to the rotor. Preferably, the anchor, the rotor, and the closer are removable from the stator tube without removing a down hole portion of the well bore string. The anchor is preferably a hold point to remove the rotor and closer from the drill string. In a preferred embodiment, the fluid pulse valve closes and opens at 0.1-10 Hz. Preferably, there are no fluid bypasses. Preferably, at least one of the slot's quantity and size and a gap between the slot and the closer are adjusted to alter pulse intensity.

Another embodiment of the invention is directed to a method of vibrating a drill string. The method comprises providing a bottom hole assembly (BHA), providing a fluid pulse valve positioned uphole of the BHA, passing fluid through the fluid pulse valve to the BHA, wherein the fluid forces the closer to rotates, which covers and uncovers the plurality of slots to create a pulse, thereby vibrating the drill string. The fluid pulse valve comprises an outer housing, a rotor contained within the outer housing, a stator tube surrounding the rotor and adjacent to the outer housing, the stator tube comprising a plurality of slots, and a closer rotationally coupled to the rotor and at least a portion of the closer in line with the plurality of slots.

Preferably, as fluid passes through the fluid pulse valve, the fluid enters the outer housing, passes through the plurality of oblong slots, into the stator and rotates the rotor. In a preferred embodiment, the fluid pulse valve further comprises at least one fixed flow area port in the stator tube. Preferably, the fluid pulse valve further comprises a gearbox, wherein gear reduction within the gearbox causes the closer to rotate at a different rate than the rotor. At least one of gear ratio of the gearbox or pitch of the rotor is preferably adjusted to alter pulse rate relative to flow rate.

In a preferred embodiment, the fluid pulse valve further comprises an anchor coupled to the rotor. Preferably, the anchor, the rotor, and the closer are removable from the stator tube without removing a down hole portion of the well bore string. The anchor is preferably a hold point to remove the rotor and closer from the drill string. Preferably, the fluid pulse valve closes and opens at 0.1-10 Hz. There are preferably no fluid bypasses in the fluid pulse valve. In a preferred embodiment, the vibrations are caused by the flow of fluid within the fluid pulse valve starting and stopping. Preferably, at least one of the slot's quantity and size and a gap between the slot and the closer are adjusted to alter pulse intensity.

Other embodiments and advantages of the invention are set forth in part in the description, which follows, and in part, may be obvious from this description, or may be learned from the practice of the invention.

DESCRIPTION OF THE DRAWING

The invention is described in greater detail by way of example only and with reference to the attached drawing, in which.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Figure 1:
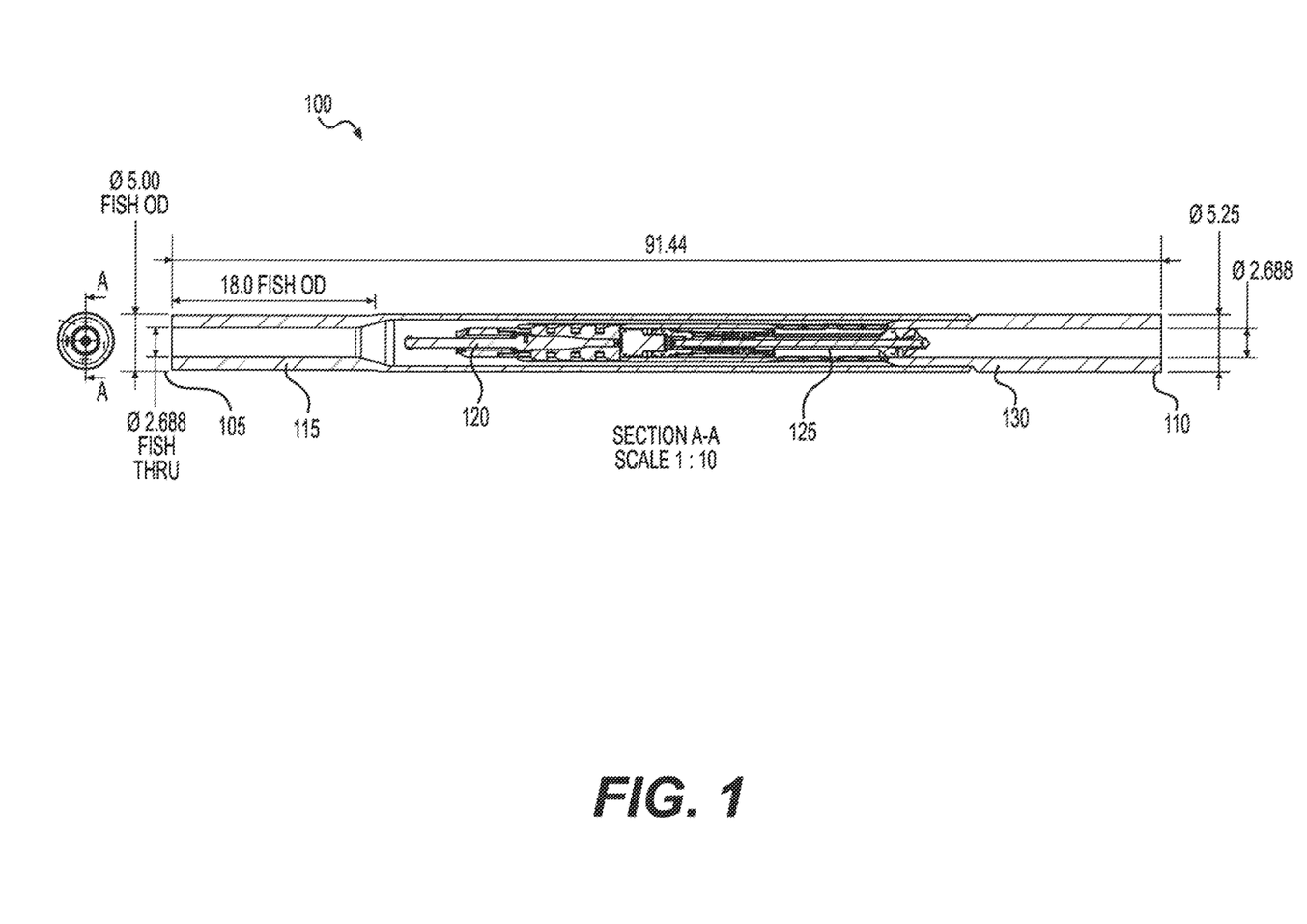
FIG. 1 is cut away side view of an embodiment of the invention.
Figure 2:
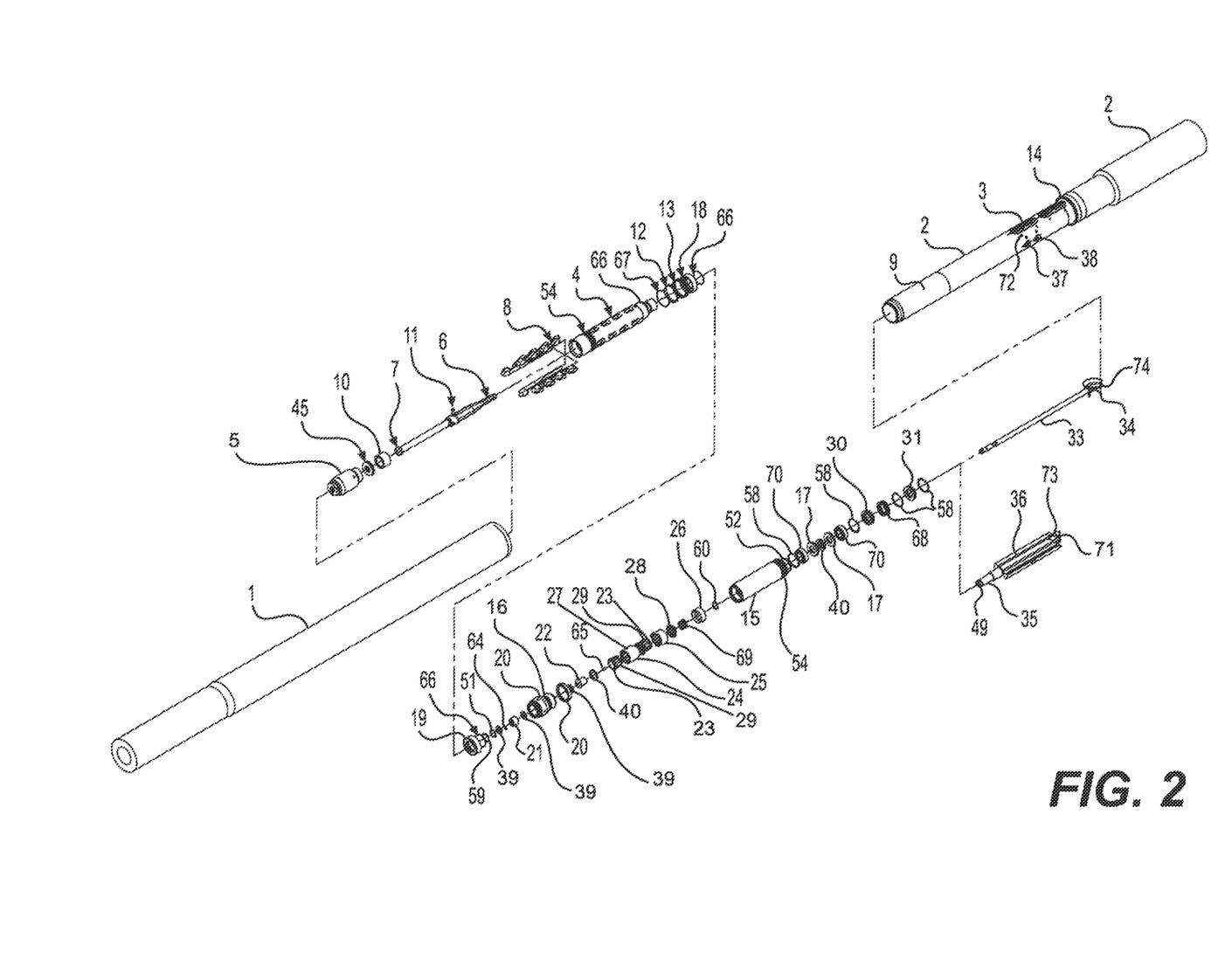
FIG. 2 is an exploded isometric view of the components of the invention.

FIG. 1 depicts a cutaway side view of an embodiment of the fluid pulse valve 100. Fluid pulse valve 100 is preferably tubular in shape with the components described herein adapted to fit within the tube. In the preferred embodiment, fluid pulse valve 100 is adapted to be coupled to a downhole drill string. Preferably end 105 of fluid pulse valve 100 is coupled on the uphole portion of the drill string while end 110 is coupled to the downhill portion of the drill string such that fluid flowing though the drill string enters fluid pulse valve 100 at end 105 and exits fluid pulse valve 100 at end 110. Preferably, fluid pulse valve 100 is of equal or similar outer diameter to the drill string. Both ends of fluid pulse valve 100 are preferably couplable to the drill string via a threaded fitting. However, other coupling methods could be used, such as friction, adhesive, bolts, and rivets. FIG. 2 depicts an exploded view of fluid pulse valve 100 indicating the preferred arrangement and interaction of the various parts of fluid pulse valve 100. Table 1 lists the parts depicted in FIG. 2.

Fluid pulse valve 100 is preferably comprised of for basic parts: housing 115, anchor 120, rotor 125, and stator 130. Housing 115 makes up the majority of the outer portion of fluid pulse valve 100. Housing 115 is tubular in shape and preferably includes end 105. Preferably, the outer diameter of housing 115 is constant and may be equal to, larger, or smaller than the diameter of the drill string or the joints of the drill string. In a preferred embodiment the inner diameter of housing 115 increases from end 105 toward end 110 of fluid pulse valve 100. The increase in diameter can be gradual, abrupt, or a combination thereof. Preferably, housing 115 is comprised of steel. However, housing 115 may be comprised of another material, for example, brass, plastic, other metals, or other manmade or naturally occurring materials. Preferably, housing 115 is detachable from the remainder of fluid pulse valve 100.

Figure 3:
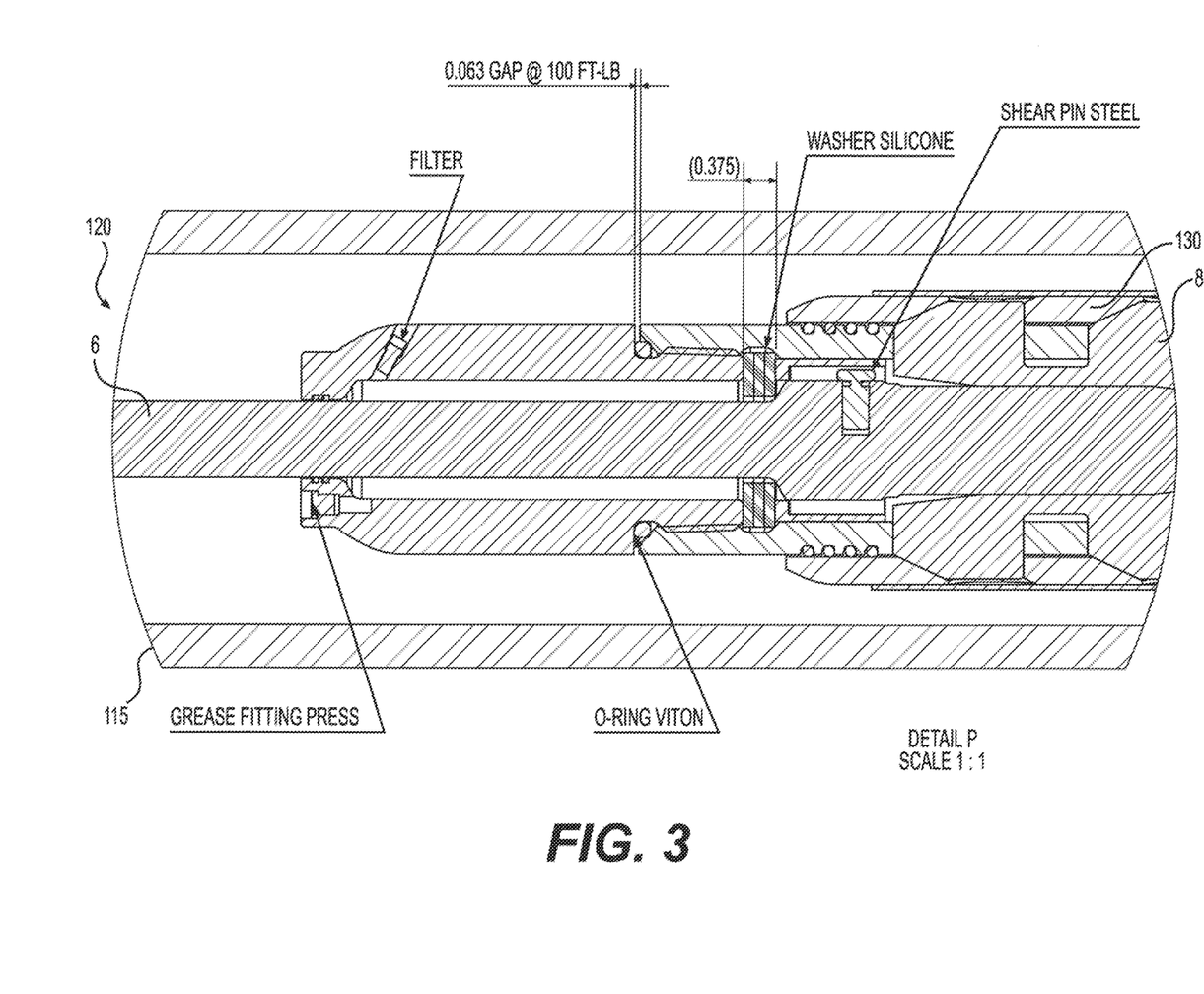
FIG. 3 is a blown-up view of an embodiment of an anchor portion of the invention.

FIG. 3 depicts a blown-up view of an embodiment of anchor 120. Preferably, anchor 120 is adapted to fit within housing 115 and adjacent to end 105. In the preferred embodiment, anchor 120 is adapted to detachably couple rotor 125 to housing 115. Anchor 120 is preferably comprised of an anchor body 4 and an anchor cap 5 which are coupled together via shear collar 10. Within Anchor 120, is preferably an anchor extraction pin 6 and anchor claws 8. Preferably, anchor claws 8 engage or otherwise couple anchor 120 to stator slots within anchor seal sleeve 9 of stator 130 (as described herein). In the preferred embodiment, anchor extraction pin 6 is adapted to be a handle or attachment point to remove anchor 120 and rotor 125 from stator 130 as required by the operator of the drill. Once removed, a clear bore is left to the remaining portion of the drill string, allowing for free point tests and measure while drilling (MWD) tool retrieval. For example, if the drill becomes stuck, the operator can pull on anchor extraction pin 6 to remove anchor 120 and rotor 125 and the portions of the drill string uphole therefrom from the drill string, thereby providing a clear path to the downhole portions of the drill string to determine where the drill string is stuck or the drilling is otherwise stopped. Preferably, anchor 120 is sealed to the drilling fluid by various seals and removably secured within fluid pulse valve 100 with various fastening devices. In a preferred embodiment, anchor 120 is filled with oil or another lubricant to reduce wear, increase efficiency, and lubricate anchor 120.

Figure 4:
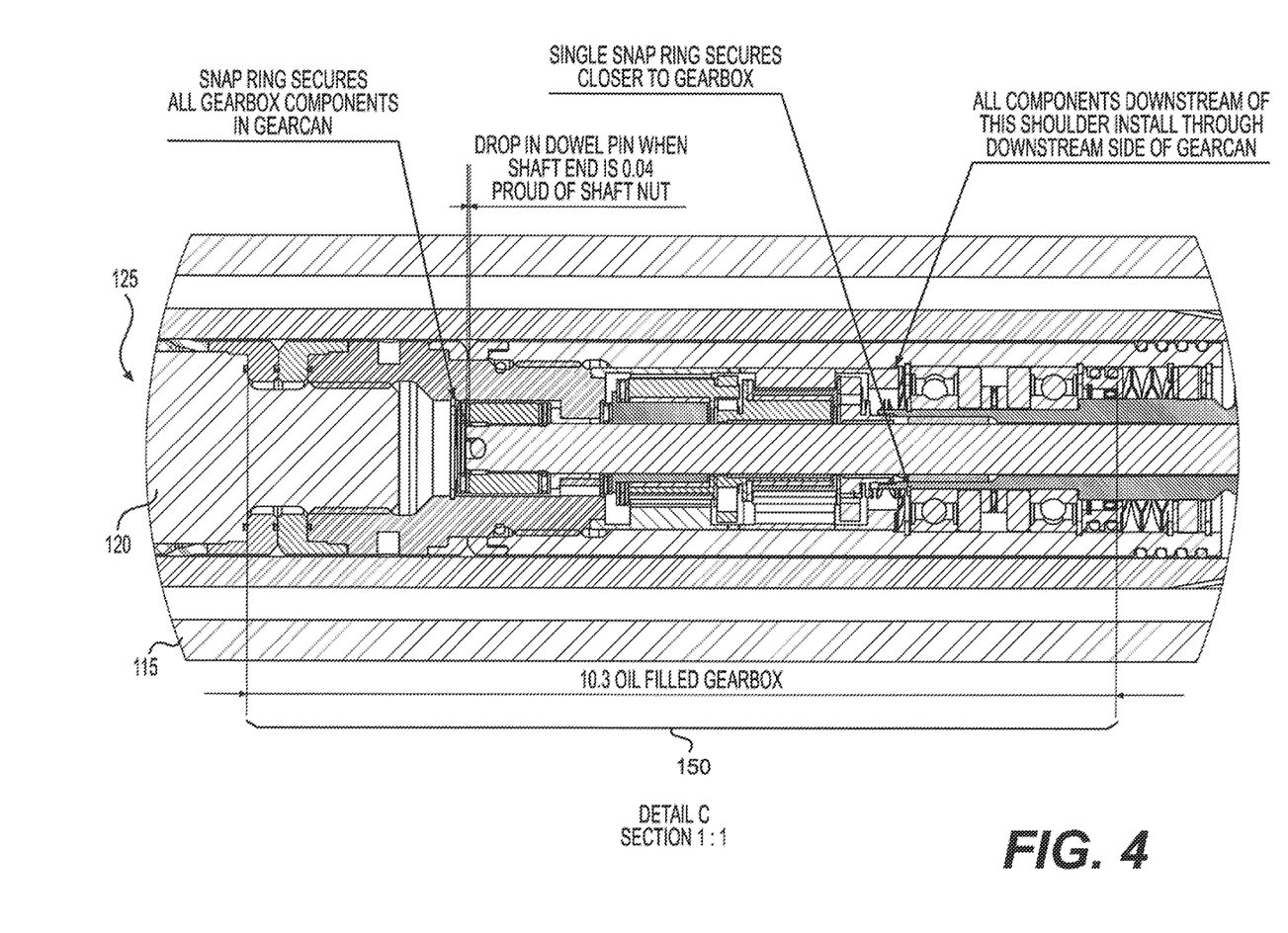
FIG. 4 is a blown-up view of an embodiment of a rotor portion of the invention.

Rotor 125 is preferably comprised of a gearbox 150, a turbine 34, and a closer 35. Preferably rotor 125 is coupled to anchor 120 within housing 115. FIG. 4 is a blown-up view of gearbox 150. Preferably, gearbox 150 provides a double gear reduction. However gearbox 150 may provide a single gear reduction or multiple gear reductions. Preferably, the gear ratio is adjustable to accommodate different uses. Preferably, gearbox 150 uses a planetary gear configuration for gear reduction. However, other gear configurations can be used. Preferably gearbox 150 has one or more valves to allow for oil expansion during use of fluid pulse valve 100. Preferably gearbox 150 is sealed to the drilling fluid by various seals and removably secured within fluid pulse valve 100 with various fastening devices. In a preferred embodiment, gearbox 150 is filled with oil or another lubricant to reduce wear, increase efficiency, and lubricate the components of gearbox 150.

Figure 5A:
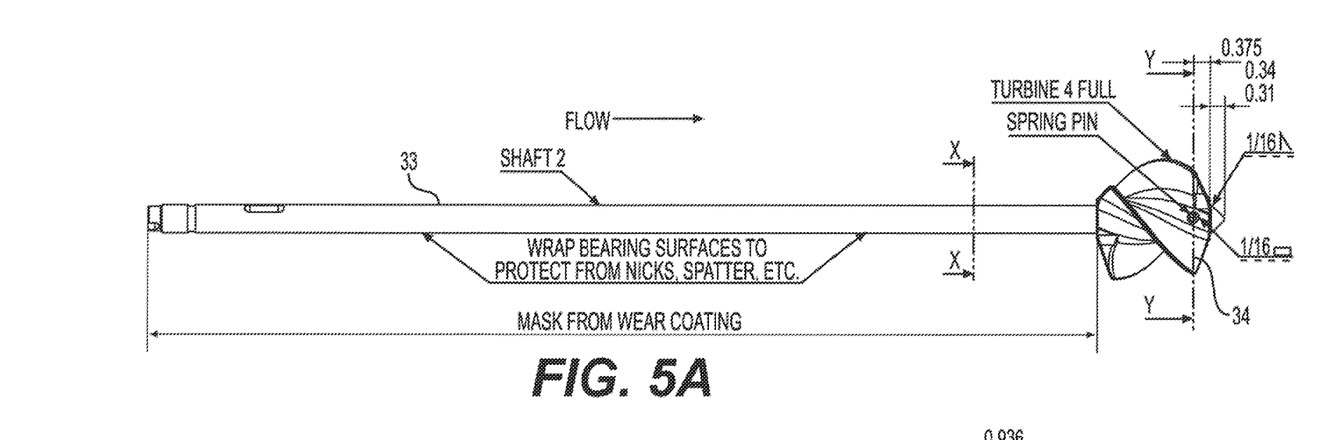
FIGS. 5A-C are views of an embodiment of a turbine portion of the invention.
Figure 5B:
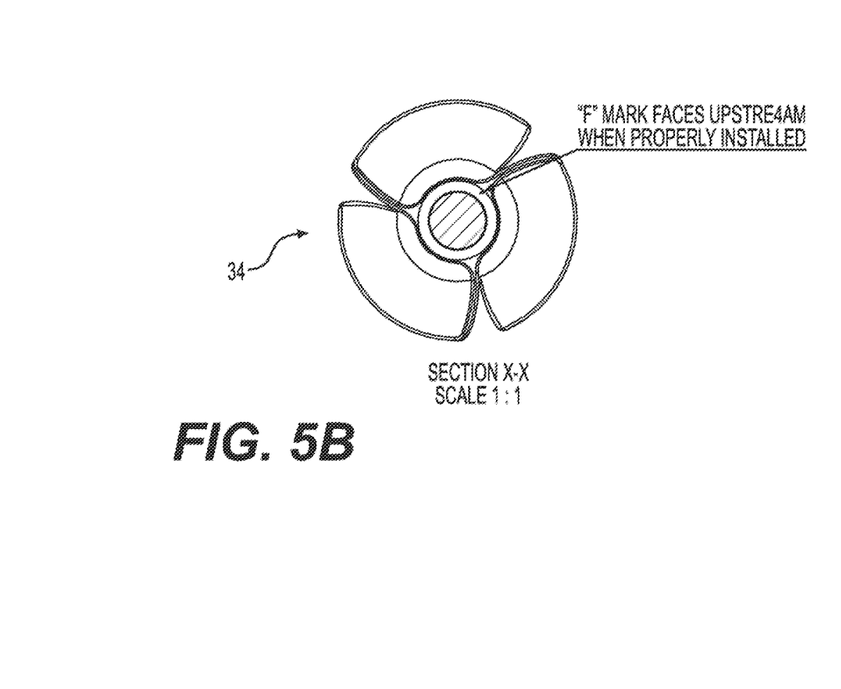
Figure 5C:
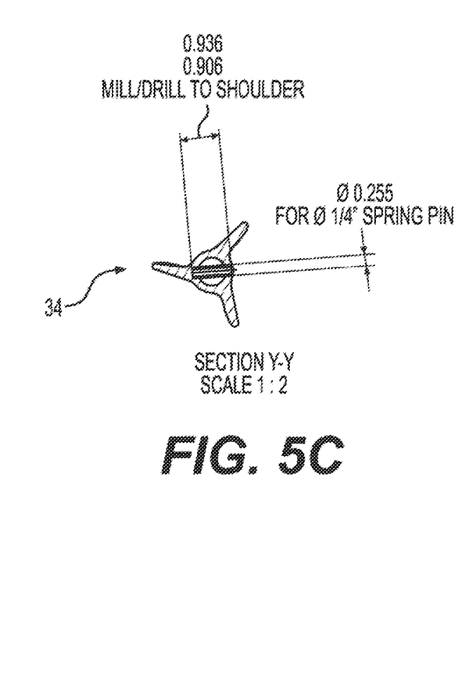

Preferably, gearbox 150 is coupled to turbine 34 via shaft 33. FIG. 5a depicts a side view an embodiment of turbine 34 and shaft 33 while FIGS. 5B-C are sectional views of the turbine 34. In the preferred embodiment, turbine 34 is a propeller or other device designed to rotate as fluid passes over it. Preferably, as turbine 34 and shaft 33 rotate, they in turn rotate the components of gearbox 150. In turn, the components of gearbox 150 rotate closer 35. Due to the gear reduction of gearbox 150, closer 35 preferably rotates at a different speed than turbine 34. Preferably, closer 35 is positioned to surround shaft 33. Preferably, at least one bearing or bushing is positioned between closer 35 and shaft 33. Closer 35 is preferably paddle shaped and adapted to cover slots 3 in stator 130, as described herein. Closer 35 can, for example, have 1, 2, 3, 4, 5, or 6 paddles. Preferably the paddles are evenly distributed about closer 14.

Figure 6A:
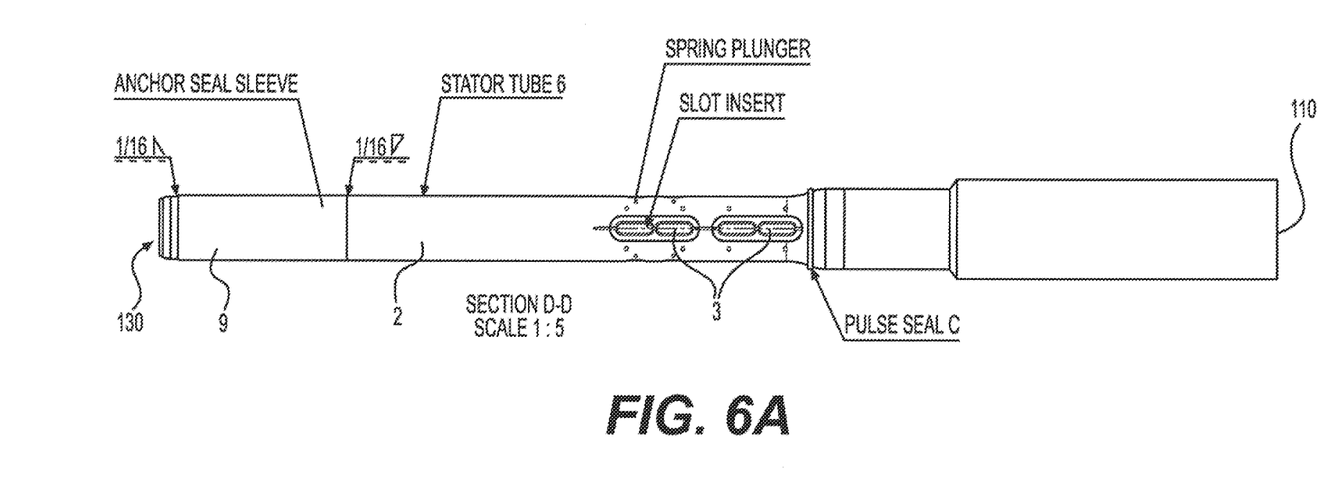
FIGS. 6A-B are views of an embodiment of a stator portion of the invention.
Figure 6B:
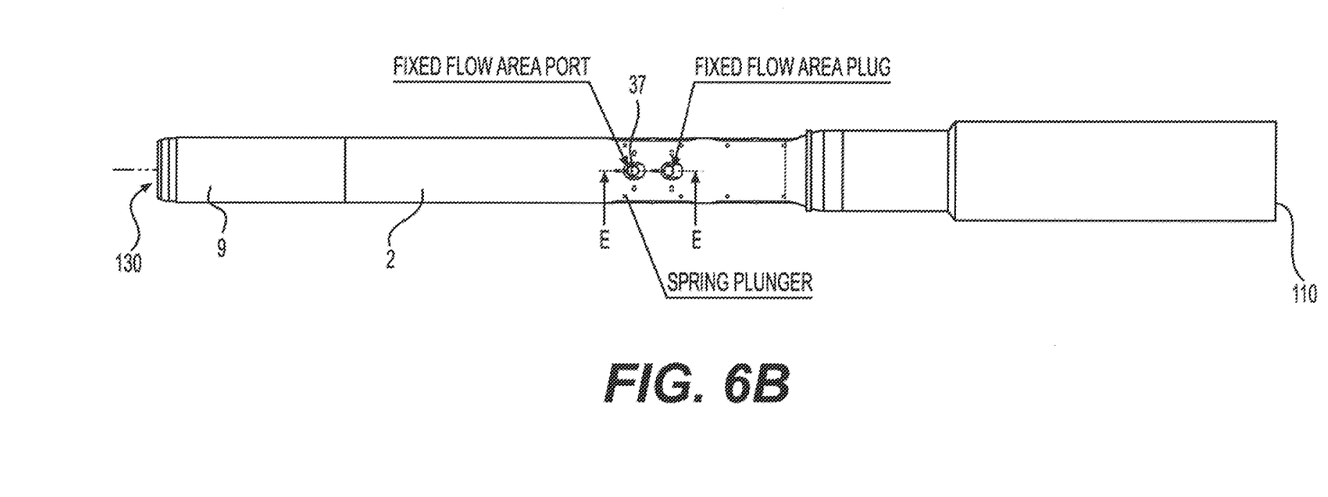

FIGS. 6A and 6B depict two side views of stator 130. Stator 130 is preferably comprised of stator tube 2 that is coupled to anchor body 4, which contains holes that are adapted to be engaged by anchor claw 8 in order to couple stator 130 to anchor 120. In the preferred embodiment, stator tube 2 surrounds gearbox 150, closer 35, and turbine 34. Furthermore, stator tube 2 preferably surrounds anchor body 4 such that anchor claw 8 removably engages both anchor body 4 and stator slots within anchor seal sleeve 9 simultaneously. Preferably, at least a portion of stator tube 2 is inserted into housing 115, while another portion extends beyond the end of housing 115 to be end 110 of fluid pulse valve 100. Preferably, stator tube 2 is coupled to housing 115 via a press fit, welded assembly. However, other devices can be used to couple the two parts together, for example, a threaded coupling, bolts, adhesive, friction, and rivets. In a preferred embodiment end 110 has an outer diameter equal to the outer diameter of housing 115.

As shown in FIG. 6A, stator tube 2 preferably has a plurality of slots 3. While eight slots are shown (four on top and four on the bottom) another number of slots can be used, for example two, four, six, ten, or twelve slots. Preferably slots 3 are in line with closer 35 such that as closer 35 is rotated, slots 3 become covered and uncovered by closer 35, creating a pulse. Slots 3 are preferably oblong in shape, for example slots can be 4 inch by ½ inch. However, slots 3 can have another shape, such as circular or rectangular. Additionally, as shown in FIG. 6B, stator tube 2 may have one or more fixed flow area ports 37 to provide a minimum flow to the turbine and provide a method of starting rotation in the event slots 3 are in line with closer 35. Fixed flow area ports 37 preferably can be sized to help control the pulse intensity of the valve. For example, larger fixed flow area ports 37 allow more fluid to flow through stator tube 2 without being interrupted by closer 35, thereby reducing the intensity of the pulse caused by the stoppage of fluid flow. Preferably, a change in the fixed flow area ports quantity and/or size can be used to adjust the pulse intensity. A change in the gap between closer 35 and slots 3 may also affect the pulse intensity. Additionally, a change in the gear ratio and or propeller pitch can preferably be used to adjust the pulse rate relative to flow rate. Such adjustments can be made upon order for a specific driller's planned flow.

During drilling, for example, drilling fluid enters fluid pulse valve 100 at end 105. The fluid flows into a cavity surrounding anchor 120 and within housing 115. The fluid continues around gearbox 150 and over stator tube 2. Then, the fluid flows though slots 3 in stator tube 2 and into the interior of stator tube 2. As the fluid flows through the interior of stator tube 2, it forces turbine 34 to rotate, which forces the gears in gearbox 150 to turn, which, in turn, rotate closer 35. As closer 35 is rotated, slots 3 become covered and uncovered by closer 35, causing the fluid to stop and restart, thereby creating pulses in fluid pulse valve 100. Preferably, due to the high speed and pressure of the fluid passing through fluid pulse valve 100, fluid pulse valve 100 vibrates the entire drill string. For example, fluid pulse valve 100 can vibrate the drill string at 0.1 Hz, 3 Hz, 5 Hz, 7 Hz, 10 Hz, or another rate. In the preferred embodiment, fluid pulse valve 100 is positioned 1500 to 2000 feet uphole of the bottom hole assembly (BHA) however, fluid pulse valve 100 can be attached to the BHA, positioned adjacent to the BHA, or at another distance from the BHA. Preferably, fluid pulse valve 100 has no bypass so that all of the fluid flows though fluid pulse valve 100.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A fluid pulse valve, comprising:
   an outer housing;
   a rotor contained within the outer housing;
   a stator tube surrounding the rotor and adjacent to the outer housing, the stator tube comprising a plurality of slots positioned within a curved outer surface of the stator tube; and
   a closer rotationally coupled to the rotor and at least a portion of the closer in line with the plurality of slots;
   wherein as the closer rotates, the closer covers and uncovers the plurality of slots to create a pulse.

2. The fluid pulse valve of claim 1, wherein as fluid passes through the fluid pulse valve, the fluid enters the outer housing, passes through the plurality of slots, into the stator tube and rotates the rotor.

3. The fluid pulse valve of claim 1, further comprising at least one fixed flow area port in the stator tube.

4. The fluid pulse valve of claim 3, further comprising a gearbox, wherein gear reduction within the gearbox causes the closer to rotate at a different rate than the rotor.

5. The fluid pulse valve of claim 4, wherein at least one of gear ratio of the gearbox or pitch of the rotor is adjusted to alter pulse rate relative to flow rate.

6. The fluid pulse valve of claim 1, wherein the fluid pulse valve is a component of a well bore string.

7. The fluid pulse valve of claim 6, further comprising an anchor coupled to the rotor.

8. The fluid pulse valve of claim 7, wherein the anchor, the rotor, and the closer are removable from the stator tube without removing a down hole portion of the well bore string.

9. The fluid pulse valve of claim 7, wherein the anchor is a hold point to remove the rotor and closer from the well bore string.

10. The fluid pulse valve of claim 1, wherein the fluid pulse valve closes and opens at 0.1-10 Hz.

11. The fluid pulse valve of claim 1, wherein there are no fluid bypasses.

12. The fluid pulse valve of claim 1, wherein at least one of the slot's quantity and size and a gap between the slot and the closer are adjusted to alter pulse intensity.

13. A method of vibrating a drill string, comprising:
   providing a bottom hole assembly (BHA);
   providing a fluid pulse valve positioned uphole of the BHA, the fluid pulse valve comprising:
      an outer housing;
      a rotor contained within the outer housing;

a stator tube surrounding the rotor and adjacent to the outer housing, the stator tube comprising a plurality of slots positioned within a curved outer surface of the stator tube; and a closer rotationally coupled to the rotor and at least a portion of the closer in line with the plurality of slots; and passing fluid through the fluid pulse valve to the BHA, wherein the fluid forces the closer to rotate, which covers and uncovers the plurality of slots to create a pulse, thereby vibrating the drill string.

14. The method of claim 13, wherein as fluid passes through the fluid pulse valve, the fluid enters the outer housing, passes through the plurality of slots, into the stator tube and rotates the rotor.

15. The method of claim 13, wherein the fluid pulse valve further comprises at least one fixed flow area port in the stator tube.

16. The method of claim 15, wherein the fluid pulse valve further comprises a gearbox, wherein gear reduction within the gearbox causes the closer to rotate at a different rate than the rotor.

17. The method of claim 16, wherein at least one of gear ratio of the gearbox or pitch of the rotor is adjusted to alter pulse rate relative to flow rate.

18. The method of claim 13, wherein the fluid pulse valve further comprises an anchor coupled to the rotor.

19. The method of claim 18, wherein the anchor, the rotor, and the closer are removable from the stator tube without removing a down hole portion of the drill string.

20. The method of claim 18, wherein the anchor is a hold point to remove the rotor and closer from the drill string.

21. The method of claim 13, wherein the fluid pulse valve closes and opens at 0.1-10 Hz.

22. The method of claim 13, wherein there are no fluid bypasses in the fluid pulse valve.

23. The method of claim 13, wherein the vibrations are caused by the flow of fluid within the fluid pulse valve starting and stopping.

24. The method of claim 13, wherein at least one of the slot's quantity and size and a gap between the slot and the closer are adjusted to alter pulse intensity.

* * * * *